Jan. 9, 1968 H. C. WALDSCHMIDT 3,363,051
COLOR TELEVISION RECEIVER OSCILLATOR
WITH DEGENERATIVE NETWORK
Original Filed Nov. 15, 1963
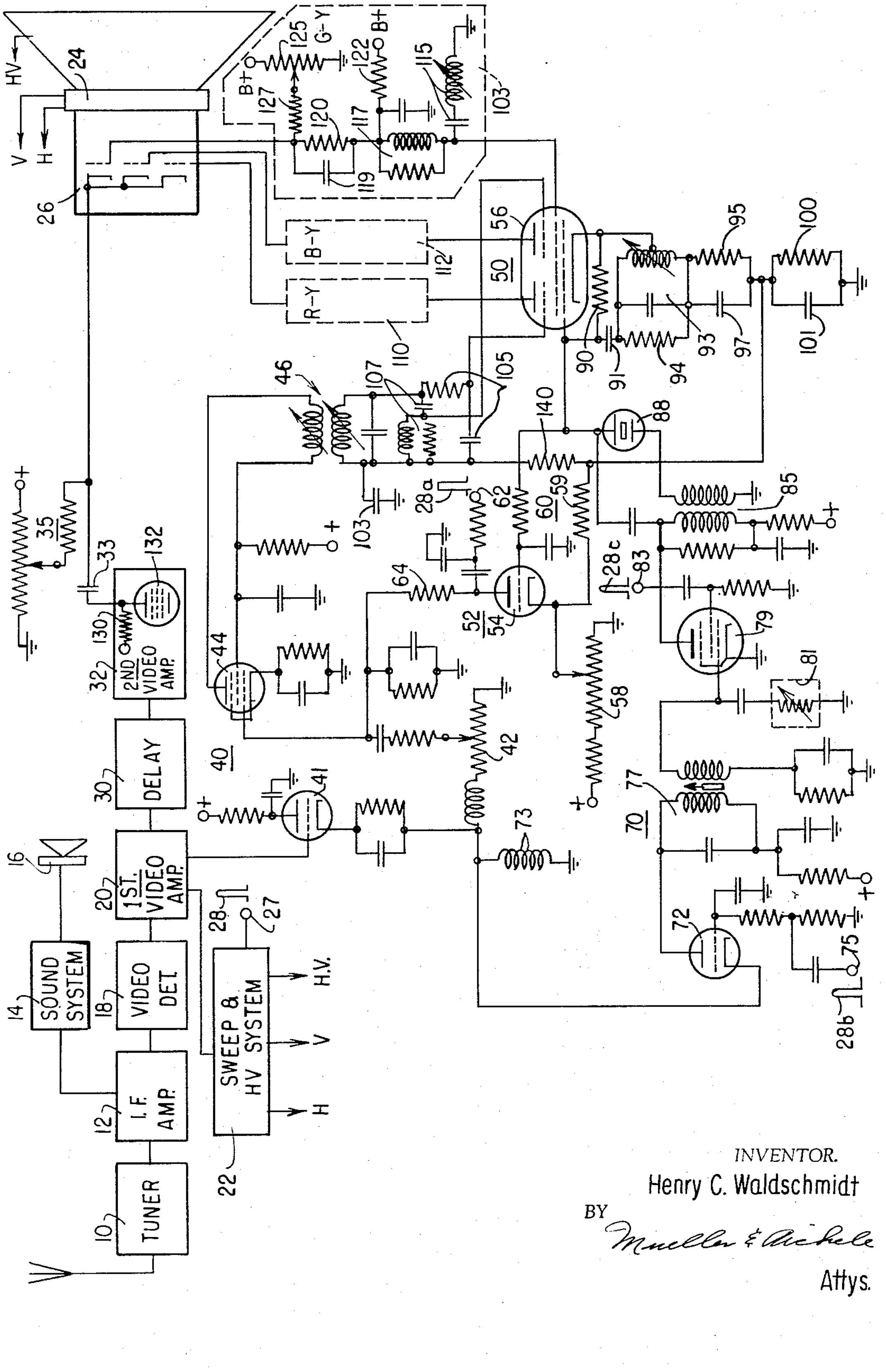
INVENTOR.
Henry C. Waldschmidt
BY
Mueller & Aichele
Attys.

United States Patent Office 3,363,051
Patented Jan. 9, 1968

3,363,051

COLOR TELEVISION RECEIVER OSCILLATOR WITH DEGENERATIVE NETWORK

Henry C. Waldschmidt, Matteson, Ill., assignor to Motorola, Inc., Chicago, Ill., a corporation of Illinois Continuation of application Ser. No. 323,960, Nov. 15, 1963. This application June 23, 1966, Ser. No. 560,015
12 Claims. (Cl. 178—5.4)

This is a continuation of application Ser. No. 323,960, filed Nov. 15, 1963, and now abandoned.

This invention relates to television receivers and more particularly to a demodulator system for color television signals.

Present day color television receivers utilize a composite signal having a carrier amplitude modulated by luminance components, as well as vertical and horizontal synchronizing pulses for synchronizing the reproduced image. The composite signal further includes chrominance information in the form of sidebands representing amplitude modulation and phase modulation of a suppressed subcarrier. To provide a reference for demodulation of the chrominance information, a few cycles of a color references burst signal are included with each horizontal synchronizing pulse so that a suitable oscillator in the receiver can be phased controlled thereby. The color information is demodulated at different phase angles with respect to the color reference signal and signals are produced which represent color information. These color signals generally represent three primary color difference signals which can be utilized with the luminance signal for energizing a cathode ray tube to produce an image with the proper elements of brightness, color hue, and color saturation.

In such a system it is common to have a color killer which is controlled by the presence or absence of the reference bursts to interrupt the color signal channel when the burst is absent and only monochrome image information is being received. Then, of course, only the luminance signal is applied to the cathode ray tube and the familiar black and white image is formed. The bandpass amplifier path for the color modulation information is effectively opened so that noise or spurious energy in its frequency range will not be applied to the cathode ray tube to produce false reproduction of color in the monochrome image. In some types of color signal demodulating systems there is also a signal path through the reference burst circuitry to the cathode ray tube, and spurious signals can cause a faulty image during monochrome reception if noise energy is allowed to be conducted through such a circuit. For example, an injection locked oscillator in which the reference burst signal is applied directly to the oscillator for locking purposes can present this problem in the form of noise streaking in the cathode ray tube image, particularly on weak or medium strength monochrome signal reception.

It is an object of this invention to improve color television reception by reducing the response of a color television receiver to spurious signals.

Another object is to avoid noise streaking during monochrome reception in a black and white or color receiver utilizing an injection locked oscillator for the color reference burst signal in the demodulator portion of the receiver.

The circuit to be described herein is particularly advantageous in a color signal demodulator which incorporates in one electron discharge device the functions of an injection locked reference oscillator, demodulation of three color difference signals, amplification of the color difference signals, and direct drive from the electron discharge device of the cathode ray tube by red, green and blue color difference signals. In such a system the reference oscillator circuit may be used to control a color killer circuit for disabling the bandpass amplifier in the absence of a reference burst signal. The conduction path for the burst signal must remain responsive during monochrome reception to permit automatic operation of the color killer when the burst signal is present.

Accordingly, a still further object of the invention is to reduce the response of a self-oscillating injection lock demodulator to spurious noise signals during monochrome signal reception, without substantially impairing the response thereof to a reference burst signal.

The circuit of the invention comprises an amplifier device with input and output electrode means and circuit means connected thereto for forming a color reference oscillator, operative, for example, as approximately 3.58 megacycles. The output electrode means is connected through a color signal demodulator to the cathode ray picture tube. Reference burst signals are applied to the input electrodes for locking the oscillations thereto. In the burst signal path there is an impedance having substantially no effect on the reference burst signal and color information, but causing substantialy attenuation of the average of the spurious energy components, such as those appearing in the burst signal path in the absence of the burst signal.

Specifically, the cathode and first two grids of a dual pentode vacuum tube are connected as an injection locked oscillator, and phase split chroma signals are applied to each of the third grids thereof. Red and blue color difference signals are available at the anodes of this vacuum tube for direct application to the cathode ray tube. A green color difference signal is also produced at the second or screen, grid of the dual pentode and this signal is directly applied to the cathode ray tube. The control or first grid of the demodulator tube provides a potential for control of a color killer for the chroma channel in accordance with the application of the reference burst signal thereto. The reference burst is applied to this control grid through a signal path gated at the horizontal deflection rate. A bias and low frequency degenerative network is connected in the cathode circuit of the dual pentode vacuum tube so that low frequency spurious signals are not developed and conducted through the demodulator system during monochrome signal reception as the system is maintained responsive to reference burst signals through the gated burst path.

The drawing is a diagram partly in block and partly schematic, showing a color television receiver incorporating the circuit of the invention.

The color television receiver in the figure includes a tuner 10 which selects a television signal and converts it to one of intermediate frequency so that it can be further amplified in the IF amplifier 12. The sound subcarrier is selected by the sound system 14 which is fed from the IF amplifier 12 and demodulated and amplified for driving the loudspeaker 16.

A video detector 18 is connected to the IF amplifier 12 to demodulate the video portions of the received composite television signal to produce luminance signal components, synchronizing signal components, color reference burst signals associated with the horizontal synchronizing components, and a band of modulation information representing the chrominance signal. These signals are applied to the first video amplifier 20. The vertical and horizontal synchronizing components are coupled to the sweep and high voltage system 22 which, in accordance with known practice, provides sawtooth sweep signals at the vertical and horizontal deflection frequencies (60 c.p.s. and 15.75 kc., respectively) for energizing the yoke 24 on the neck of the tri-gun cathode ray picture tube 26. The system 22 also furnishes a high voltage potential for the screen of tube 26. At terminal 27 of the system 22 there is available a voltage pulse 28 recurring at the horizontal sweep rate of 15.75 kc.

The luminance components of the demodulated composite television signal are coupled through the delay network 30 from the first video amplifier 20 to the second video amplifier 32. The delay network 30 is included to time delay the luminance information so that it will coincide with the chroma information as signals of both types are applied to the picture tube 26. The second video amplifier 32 is coupled through the blocking capacitor 33 to the interconnected cathodes of the three electron guns in the color picture tube 26. A potentiometer network 35 is also direct current connected to the cathode of the tube 26 for brightness control.

The bandpass amplifier, or color IF amplifier, 40 includes a vacuum tube 41 connected as a cathode follower to the first video amplifier 20. The chroma modulation information is coupled to the tube 41 and this information is in the form of modulation of a 3.58 megacycle color subcarrier. A variable resistor 42 in the cathode circuit of the tube 41 serves as a chroma, or intensity, control so that a variable portion of the chroma information can be applied to the pentode amplifier tube 44, also in the color IF amplifier 40. The anode circuit of tube 44 is connected to the primary of a coupling transformer 46 which couples the chrominance modulation information to the color demodulator 50.

The receiver further includes a color killer circuit 52 for cutting off the pentode tube 44 in the absence of a reference burst signal so that only the monochrome or luminance information would be transferred through the video amplifiers 20 and 32 to be reproduced by the tube 26. The color killer circuit comprises a triode vacuum tube 54 having a control grid which is direct current connected to the control grid of the demodulator tube 56. The cathode of tube 54 is connected to a variable potentiometer 58 to establish a threshold bias for this tube. The potentiometer 58 is adjusted so that on black and white transmission the tube 54 is just into conduction. The cathode of tube 54 is also connected through isolation resistor 59 to the cathode circuit of tube 56. A filter network 60 is connected in the grid circuit of tube 54 so that essentially only a direct current potential is applied to the tube 54 from the grid to cathode of the demodulator tube 56. A voltage pulse 28*a* is applied to the terminal 62 which is connected to the anode of tube 54. The pulse 28*a* is derived from the terminal 27 of the sweep system 22. The pulse 28*a* is AC coupled to the anode of tube 54 and is the only source of anode voltage. Conduction of tube 54 upon reception of a monochrome transmission will produce a negative potentional at the anode of tube 54 which is coupled through the isolation resistor 64 to the control grid of the tube 44 in the bandpass amplifier for cutting off this tube. Thus, the color IF amplifier 40 will be disabled during reception of a monochrome television signal.

During a color transmission, that is when the color reference bursts signals are present to cause increased drive of the tube 56 as a synchronized color reference oscillator (rather than self-oscillating at a low level), the voltage on the grid of tube 56 will become more negative (with respect to its cathode) which will bias tube 54 to cutoff whereby the cutoff bias for tube 44 is removed. Thus, the color IF tube 44 may operate normally to pass the chrominance modulation information to the color demodulator 50.

The color reference burst signal is derived in the burst separator system 70. The system 70 includes a triode vacuum tube 72 having a cathode connected to the cathode circuit of tube 41 in the color IF amplifier 40. A choke 73 is included in the cathode circuit of tube 41 in order to offer an output impedance across which can be derived the burst signals which appear on the trailing portion of the horizontal synchronizing pulses.

Tube 72 is gated or keyed into conduction during the horizontal retrace time by means of a horizontal pulse 28*b* applied to the grid of tube 72 by way of terminal 75. Terminal 75 is connected to the source of horizontal pulses 27 in the sweep system 22. The triode tube 72 does not conduct during the interval between horizontal synchronizing pulses but is gated into conduction during the horizontal synchronizing pulses so that the reference burst signal is developed in the tuned circuit 77 connected to the anode of tube 72.

A pentode tube 79 is also included in the burst separator system 70 to further amplify the color synchronizing burst signal in the receiver. The control grid of tube 79 is inductively coupled to the tuned circuit 77 and this grid circuit is tunable by means of variable resistor means 81. Tuning the grid circuit of tube 79 provides a hue control for the receiver since the output of tube 72 and the input of tube 79 are tightly coupled and changing the loading in the grid circuit of tube 79 will reflect back a tuning change in circuit 77 which changes the phase of the color synchronizing signal with respect to the chroma information in the bandpass amplifier 40.

Tube 79 is gated into conduction by means of a horizontal pulse 28*c* applied to the terminal 83 from the terminal 27 in the sweep system 22. The double gating arrangement provided in the burst separator system 70 prevents capacity feedthrough of the color signal to the demodulator stage 50. The burst signal, separated from the remainder of the composite television signal, is thus derived in the anode circuit of the pentode tube 79 to be available in the coupling transformer 85.

The color demodulator circuit 50 includes a vacuum tube 56 shown as a dual pentode with the cathode, the control grid and the screen grid being common to both pentode sections of the tube. This tube and the associated circuitry perform the functions of demodulating the red and blue color difference signals, amplifying these color difference signals, oscillating at the carrier frequency of the color subcarrier, and demodulating directly the green color difference signal. The system can be described as a self-oscillating, dual pentode, injection lock demodulator.

The cathode, control grid and screen grid of tube 56 are connected as an oscillator which is locked in phase by the (approximate) 3.58 megacycle color reference signal supplied thereto from the transformer 85. A crystal 88 is connected between the control grid of tube 56 and the secondary winding of transformer 85 to act as a crystal filter for the incoming color synchronizing signal. Since the crystal is the highest Q tank circuit in the oscillator, it will ring at relatively high amplitude at a frequency of 3.58 megacycles to cause the otherwise free running oscillator portion of the demodulator 50 to follow in phase with the input color burst reference signal.

A grid leak resistor 90 is connected between the control grid of tube 56 and the cathode thereof and a feedback coupling capacitor 91 is connected between the control grid and the top of the tank circuit 93. Circuit 93 is parallel tuned to the color reference frequency of 3.58 megacycles and includes an inductor which is tapped for connection to the cathode of tube 56. A damping resistor 94 is connected across the tank 93. Cathode bias is provided by the resistor 95, shunted by the bypass capacitor 97. The parallel combination of resistor 95 and capacitor 97 is connected between the bottom of the tuned circuit 93 and the top of parallel connected resistor 100 and capacitor 101. The bottom side of the combination 100, 101 is connected to ground The function of this network will be explained subsequently.

The screen grid of the tube 56 effectively forms the anode for the oscillator section of this duel tube. This grid is connected to a positive potential source through the network 103 which comprises a low pass filter and a load impedance for the green color difference signal as will be explained. Accordingly at the screen grid of tube 56 there appears in the electron stream the color reference signal which has been phased locked to the burst signal derived from the received color television signal.

The chrominance modulation information of the received signal is applied to the demodulator tube 56 by way of the coupling transformer 46. The secondary winding of transformer 46 is tuned to substantially 3.58 megacycles and includes one terminal which is bypassed to ground through capacitor 103. The other terminal of the secondary winding is connected through a delay network 105 to the third grid of the left hand section of tube 56. The secondary winding of transformer 46 is also connected through a phase shift network 107 to the third grid of the right hand section of demodulator tube 56. The right hand section of the tube demodulates the B–Y or blue color difference signal and the left hand section of the tube demodulates the R–Y or red color difference signal.

Phase shift network 105, connected across the secondary of transformer 46, serves to delay the applied signal by 44°. The phase shift network 107, also connected across the secondary, advance the phase of the chroma signal by 43.5°. Thus signals from transformer 46 are out-of-phase by 87.5° between the two chroma grids of tube 56. With reference to the incoming signal, the phase of the local generated color reference signal in tube 56 is 270°. As the chrominance information is applied to the chroma grids of tube 56, and as these signals vary in phase and amplitude to respectively represent variations in hue and saturation in the televised image, the current conduction to the two output anodes of tube 56 will vary in a manner to represent the R–Y and B–Y color difference signals.

Network 110 is connected to the left hand anode of tube 56 and network 112 is connected to the right hand anode. Networks 110 and 112 correspond in circuitry to the network 103 connected to the screen grid of tube 56. Thus, the red and blue color difference signals are developed respectively in the networks 110 and 112 which includes suitable load impedances and peaking networks so that these signals can be applied to the control grids in the cathode ray tube 26 which are associated with production of that part of the overall image associated with the colors red and blue.

The G–Y or green color difference signal is recovered from the screen grid of the demodulator tube 56 through the load impedance network 103. The construction of tube 56 is such that when plate current flows in either one of the anodes, the current of the screen grid will be reduced thus causing a rise in the voltage at the screen grid. When both sections of the tube 56 are conducting, as they are when the signal component representing green is present on the chroma grids of the tube, the demodulator anodes will drop in potential to reduce the drive to the red and blue guns and this drop in plate voltage is accompanied by a rise in the screen voltage to drive the green gun harder.

For purposes of a more complete explanation, a description will be given of the network 103, with the understanding that the networks 110 and 112 include corresponding components connected in the same manner, although differing in value as will be noted subsequently. In the network 103 there is a series of resonant trap 115 for removing the 3.58 magacycle component which appears at the output of tube 56. There is also a peaking network 117 for modifying the frequency response of the system. A coupling capacitor 119 is series connected in the path from the output or screen electrode of tube 56 to the green control grid of the cathode ray tube 26. A resistor 120, connected across capacitor 119, provides some amount of DC coupling in this path. The load impedance across which the output, or green color difference, signal is developed is the resistor 122 connected from the coupling capacitor 119 to the B+ potential source. To establish a DC bias potential for the green control grid of the cathode ray tube, a potentiometer 125 includes a variable arm connected through an isolating resistor 127 to the control grid of the picture tube 26.

It should be recognized that in order to develop satisfactory color difference signals in the demodulator 50, a certain relationship must exist between the various signal components translated in the demodulator and this is accomplished through proper selection of the components of the system. In accordance with known color television practices, and the character of a color television signal which is in common use in the United States, the operation of the demodulator must produce signals in keeping with the requirements of the cathode ray tube 26 for proper representation of colors as well as various shades of gray, and proper representations of brightness and saturation of the television image. In order to insure that all of these requirements are satisfactorily met in a system which directly demodulates the red, blue and green color difference signals without complex matrix circuitry or further amplification beyond the demodulator tube itself, there are several factors which are taken into account in design of this system, particularly in this system where the G–Y signal is directly demodulated and its level may be lower than desired. One factor is the proper selection of the networks 105 and 107 to apply the chroma information to the tube 56 with a proper phase difference and amplitude such that the three color difference signals will be as accurate as possible at the output electrodes of the tube 56. Further adjustment of the level of the detected color signals with respect to one another in order to properly drive the tube 26 is also made by proper selection of the output load impedances in the networks 103, 110 and 112. For example, the B–Y signal developed in the network 112 may be divided down somewhat in order to establish its amplitude relative to the other two color difference signals at the proper level. Finally some amount of matrixing of the color difference signals can take place in the cathode circuit of the picture tube 26. For example, the resistor 130, which is the plate load resistor for the video amplifier tube 132 in the circuit 32, can form an impedance in the series circuit path for the picture tube cathodes which will establish the proper level of the G–Y signal with respect to the drive of the tube 26 by the R–Y and B–Y signals. Accordingly in summary, it may be seen that the amplitude and phase of the chroma information applied to the tube 56 by the networks 105 and 107, the relative amplitudes of the three color difference signals developed by the networks 103, 110 and 112, and the cathode impedance for the color tube 26 can all be interrelated such that the demodulated color difference signals will properly drive the tube in view of the luminance signal applied thereto from the video amplifier 32 and the various characteristics of the tube 26, in order to produce a faithful color television image.

As has been previously explained, in the absence of a color burst reference in the received program signal, the control grid to cathode potential of the demodulator tube 56 will permit conduction of the color killer tube 54, due to the threshold setting of potentiometer 58 for establishing the conduction point of this tube and the connection of this tube to the grid to cathode circuit of the tube 56. Conduction of the color killer tube 54 causes control grid cutoff of the amplifier tube 44 in the color IF amplifier 40. It may be seen that this will interrupt the color signal path through the bandpass amplifier 40 and the demodulator 50 to the control grids of the tri-beam cathode ray tube 26. Therefore, spurious signal energy accompanying a received monochrome signal will not be translated through this path to cause impairment of the reproduced image. However, the burst separator system 70 is fed from the tube 41 in the bandpass amplifier 40, which comes ahead of the tube 44 cutoff by the color killer 52, and spurious signal energy can therefore be translated through the initial portion of the bandpass amplifier 40, through the burst separator system 70, through the crystal 88 and to the control grid of tube 56 to cause a variation in current at the output electrodes of the color demodulator. Particularly on medium or weak program signals, noise or spurious energy can be gated through the system 70 at the horizontal deflection rate to cause streaking or image detail loss in a portion of a horizontal line or up to several horizontal lines in the picture, since there can be an alternating current variation between the control grid and cathode of tube 26 which will vary from one horizontal interval to another. This undesired voltage variation amounts to a modulation of the oscillator at something approaching an average of the spurious energy at the control grid of demodulator tube 56. Such a variation causes a relatively low frequency alternating current change at the anodes and screen grid of the tube 56 in effect forming an undesired signal at the control grids of the picture tube 26. It should be recognized, of course, that the signal path for the reference burst signals to the control grid of tube 56 must remain open during monochrome signal reception since that is the control element which will change in potential upon reception of the color signal in order to operate the color killer circuit 52 to render operative the signal path through the bandpass amplifier 40.

To overcome the described impairment of a monochrome image during medium to weak signal reception, resistor 100 in the cathode current path of the demodulator 56 is chosen to have a large enough value such that the amount of low frequency alternating current voltage developed thereacross by the average of spurious signals is sufficiently degenerative to greatly reduce or eliminate the effect of this spurious energy at the output electrodes of the tube 56. By this means the noise streaking can be effectively overcome. The capacitor 101 connected in parallel with the resistor 100 has a value sufficient to bypass the 3.58 megacycle signal information. Very little demodulated chroma is developed in the cathode circuit since this appears between the anodes and screen grid of tube 56. Capacitor 101 may bypass some of the higher frequency demodulated components appearing in the cathode by way of the screen circuit and any slight degeneration of low frequency chroma in the cathode circuit from the screen signal is insignificant.

A resistor 140 is connected from the junction of resistors 95 and 100 to the bottom side of the secondary winding of chroma coupling transformer 46. Thus, there is a direct current path through the secondary winding of transformer 46 to the red chroma grid and through part of network 107 to the blue grid to establish these grids at a bias with respect to the cathode which is determined by the value of the cathode bias resistor 95 connected between resistor 100 and the cathode of tube 56. That is, the grid bias for the tube 56 is determined by resistor 95 and not by the resistor 100. Capacitor 103 connected from the grid side of resistor 140 to ground has a value to bypass both the 3.58 megacycle color information and the low frequency spurious signal information. Resistor 140 is made large enough to isolate the effects of the bypass capacitor 103 from the top of resistor 100 where the degenerative action for the low frequency spurious energy must take place between cathode and control grid.

In a system of practical construction operating in accordance with the principals described, parts value for the components were as follows:

Tube 56—15LE8
Resistor 90—47,000 ohms
Capacitor 91—10 micromicrofarads
Resistor 94—6,800 ohms
Resistor 95—56 ohms
Capacitor 97—.05 micromicrofarad
Resistor 100—1,000 ohms
Capacitor 101—.01 microfarad
Capacitor 103—.15 microfarad In this manner it is possible to degenerate the cathode circuit of the demodulator tube 56 for low frequency spurious signals gated into the injection locked oscillator portion of the demodulator, while at the same time not adversely effecting the operation of the demodulator with respect to its functions of generating a color reference signal and properly responding to the chrominance signal which it must demodulate. It will be noted that the tube 56 and its associated circuitry will continue to function as an oscillator despite the lack of a locking burst signal such as would be present during color signal reception. This reference signal is, of course, otherwise filtered out through the traps previously described, and the low frequency attenuation network 100, 101 effectively removes the spurious energy which would otherwise pass through the demodulator circuit. Therefore, the demodulator may remain responsive to a reference burst signal for proper response to a color signal, while at the same time the injection locked demodulator system remains relatively insensitive to spurious energy which might be developed during monochrome operation to cause impairment of the reproduced black and white image. In the above described manner, a relatively simple and inexpensive circuit may be used to render a color television receiver better able to reproduce a monochrome image.

I claim:

1. In a color television receiver having a cathode ray tube for displaying a color image and means to provide a composite color signal comprising modulated chroma signals and color reference signals, the combination of; a separator system to derive the color reference signals from the composite color signal, an oscillator circuit responsive to the color reference signals to develop a phase locked oscillatory signal, and signal utilization means to which said chroma signals and said oscillatory signal are applied to develop demodulated chroma information for the cathode ray tube, said oscillator circuit including a degenerative network for signal energy in a frequency range below the frequency of the color reference signals to reduce translation of spurious signals through said oscillator circuit to the cathode ray tube in the absence of the color reference signals.

2. In a color television receiver having a cathode ray tube for displaying a color image and means to provide a composite color signal comprising modulated chroma signals and color reference signals, the combination of; a separator system to derive the color reference signals from the composite color signal, an oscillator circuit responsive to the color reference signals to develop a phase locked oscillatory signal, and signal utilization means to which said chroma signals and said oscillatory signal are applied to develop demodulated chroma information for the cathode ray tube, said oscillator circuit including attenuating means comprising resistance and capacitance for attenuating signal energy in a frequency range below the frequency of the color reference signals to reduce translation of spurious signals through said oscillator circuit to the cathode ray tube in the absence of the color reference signals.

3. In a color television receiver having a cathode ray tube for displaying a color image and means to provide a composite color signal comprising modulated chroma signals and color reference signals, the combination of; a separator system to derive the color reference signals from the composite color signal, an oscillator circuit including resonant circuit means responsive to the color reference signals to develop a phase locked oscillatory signal, and signal utilization menas to which said chroma signals and said oscillatory signal are applied to develop demodulated chroma information for the cathode ray tube, said oscillator circuit including attenuating means exclusive of said resonant circuit means for attenuating signal energy in a frequency range below the frequency of the color reference signals to reduce translation of spurious signals through said oscillator circuit to the cathode ray tube in the absence of the color reference signals.

4. The television receiver according to claim 3, said oscillator circuit including an amplifying device with input and output circuits, said attenuating means being a degenerative network in a path common to both said input and said output circuits.

5. The television receiver according to claim 3 further having a system for deflecting the beam in the cathode ray tube at a horizontal deflection rate, means for gating said separator system into conduction at said horizontal deflection rate whereby an average of the spurious signal energy is coupled therethrough to said oscillator circuit.

6. The television receiver according to claim 3, said oscillator circuit comprising an amplifying device with input electrodes, said attenuating network comprising a degenerative network connected between said input electrodes.

7. The television receiver according to claim 3, said attenuating means being a degenerative network comprising resistance means and capacitance means connected in parallel, the value of said capacitance means being selected to be a relatively low impedance to the color reference signals and a relatively high impedance to the spurious signals.

8. The television receiver according to claim 3, said attenuating means being a degenerative network comprising resistance means having a value sufficient to allow the spurious signals to be developed thereacross to provide the reduced translation thereof through said oscillator circuit.

9. The television receiver according to claim 3, further having signal translating means coupled to said signal utilization means to provide a signal path for the modulated chroma signals, means controlled by said oscillator circuit and coupled to said signal translating means to interrupt the signal path in the absence of the color reference signals.

10. The color television receiver according to claim 3, said signal utilization means and said oscillator circuit forming a demodulator circuit, said demodulator circuit including an electron discharge device having a cathode a first control grid, second and third further control grids, and output electrodes, said second and third grids individually controlling current to respective associated ones of said output electrodes, a feedback network connected between said first control grid and said cathode for establishing said oscillatory signal, said resonant circuit means including a crystal for applying the color reference signals from said separator system to said first control grid for phase locking the oscillatory signal, a band-pass amplifier providing the modulated chroma signals at different phases respectively to said second and third control grids, means coupling said output electrodes to the cathode ray tube to apply the demodulated chroma information thereto, a cathode bias resistor connected in circuit with said cathode, said attenuating means comprising a degenerative network connected between said bias resistor and a reference point and comprising a capacitor having a value for bypassing signals of the color reference signal frequency and further comprising a resistor for degenerating signals in a range below the frequency of the color reference signals.

11. The color television receiver according to claim 10 further including a color killer circuit controlled by the potential of said first control grid for disabling said band-pass amplifier in the absence of the color reference signals.

12. The color television receiver according to claim 10, said demodulator circuit further including a bias conducting resistor direct current connected from the junction of said cathode bias resistor and said degenerative network to said second and third control grids to establish a bias reference therefor, and a bypass capacitor connected from said bias conducting resistor to the reference point to prevent coupling of said spurious energy through said last named resistor.

References Cited

UNITED STATES PATENTS

| | | | |
|---|---|---|---|
| 2,725,422 | 11/1955 | Stark et al. | 178—5.4 |
| 2,848,529 | 8/1958 | Werenfels | 178—5.4 |
| 2,990,445 | 6/1961 | Preisig | 178—5.4 |
| 3,023,271 | 2/1962 | Hansen | 178—5.4 |

ROBERT L. GRIFFIN, *Acting Primary Examiner.*

R. MURRAY, *Assistant Examiner.*